United States Patent [19]

Sun

[11] Patent Number: 5,072,930
[45] Date of Patent: Dec. 17, 1991

[54] LOAD APPLYING DEVICE FOR AN EXERCISE BICYCLE

[75] Inventor: Paul Sun, Taichung Hsien, Taiwan

[73] Assignee: Giant Manufacturing Co., Ltd., Tachia Taichung Hsien, Taiwan

[21] Appl. No.: 488,673

[22] Filed: Mar. 2, 1990

[51] Int. Cl.⁵ .............................................. A63B 21/00
[52] U.S. Cl. .................................... 272/73; 272/129; 310/94
[58] Field of Search .......................... 272/73, 129, 69; 310/93, 94, 105, 154

[56] References Cited

U.S. PATENT DOCUMENTS

| | | | |
|---|---|---|---|
| 4,713,567 | 12/1987 | Fey et al. | 310/105 |
| 4,775,145 | 10/1988 | Tsuyama . | |
| 4,780,637 | 10/1988 | Wolcott | 310/105 |
| 4,790,528 | 12/1988 | Nakao . | |
| 4,800,310 | 1/1989 | Nakao . | |
| 4,817,938 | 4/1989 | Nakao . | |

*Primary Examiner*—Stephen R. Crow
*Attorney, Agent, or Firm*—Ladas & Parry

[57] ABSTRACT

A device for applying a load to a rotating shaft of an exercise bicycle which receives the load. A rotor, which is to be rotated by the rotating shaft of the exercise bicycle, is rotatably mounted by a bearing to a fixed main shaft of the load applying device. The rotor is a tubular magnetic conductor having a closed end, and an open end and a cylindrical wall. An electromagnet includes a first and a second disk coaxially fixed to the main shaft and sleeved by the cylindrical wall of the rotor. The first and second disks respectively serve as a first and a second pole in a magnetic field created by the electromagnet. An annular exciting coil is fixed between the first and second disks. Each of the first and second disks has radially projecting teeth extending from the periphery thereof but not in contact with the cylindrical wall of the rotor. A closed magnetic flux in the magnetic field of the electromagnet passes through the first and second poles of the electromagnet and the cylindrical wall of the rotor. When the rotor is rotated, the rotor cuts the magnetic field and thereby produces an induced eddy current, causing an eddy current brake effect to the rotor.

4 Claims, 4 Drawing Sheets

LOAD APPLYING DEVICE FOR AN EXERCISE BICYCLE

BACKGROUND OF THE INVENTION

This invention relates to a load applying device, more particularly to a load applying device for an exercise bicycle.

Exercise bicycles are widely used for indoor exercise. A load applying device is provided with the exercise bicycle for optionally applying load during exercise for a user according to the user's physical condition.

In the past, a load applying device had a weight for adjusting the load applied to the user. Recently, a programmable computerized exercise bicycle has been developed and disclosed in U.S. Pat. No. 4,790,528. A load applying device for an exercise bicycle has also been proposed and developed for applying load to a user by means of a brake effect caused by an eddy current, which was disclosed in U.S. Pat. No. 4,775,145, U.S. Pat. No. 4,800,310, and U.S. Pat. No. 4,817,938. However, the intersection area between the magnetic lines of force and the rotor of the conventional load applying device is small.

SUMMARY OF THE INVENTION

It is an object of this invention to provide an improved load applying device for an exercise bicycle which has a magnetic field produced by an electromagnet therein and a rotor transversing the magnetic field, in which the intersection area between the magnetic lines of force of said magnetic field and said rotor is larger than that of the conventional load applying device.

A feature of this invention is to provide a device for applying a load to a rotating shaft of an exercise bicycle which receives the load. A user can set a proper controlling current to control the load applied by the load applying device, so that the user can exercise according to his/her physical condition. When the user pedals the exercise bicycle, the transmission gear of a speed increasing mechanism of said exercise bicycle is rotated by said pedals and thereby, a rotor coupled by a bearing to a fixed main shaft of the load applying device of this invention is rotated with respect to said main shaft. The rotor is a tubular magnetic conductor having a closed end, an open end and a cylindrical wall. An electromagnet is fixed to the main shaft and coaxially received in the rotor. The electromagnet has a first and a second disk respectively serving as a first and a second pole in a magnetic field created by said electromagnet, and an annular exciting coil mounted between said first and said second disks. Each of the disks has teeth projecting radially from the periphery thereof but not contacting with the cylindrical wall of the rotor. The teeth of the first disk are staggered axially with the teeth of the second disk. A closed magnetic flux in the magnetic field of the electromagnet passes through the first and second poles of the electromagnet and the cylindrical wall of the rotor around said first and second poles. When the rotor rotates, said rotor cuts the magnetic field and thereby produces an induced eddy current, causing an eddy current break effect to said rotor. Because the magnetic lines of force of the magnetic field pass parallel through the cylindrical wall of the rotor, the intersection area between said magnetic lines of force and said rotor is larger than that of a conventional load applying device, in which the magnetic lines of force transverse the rotor thereof.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 1:
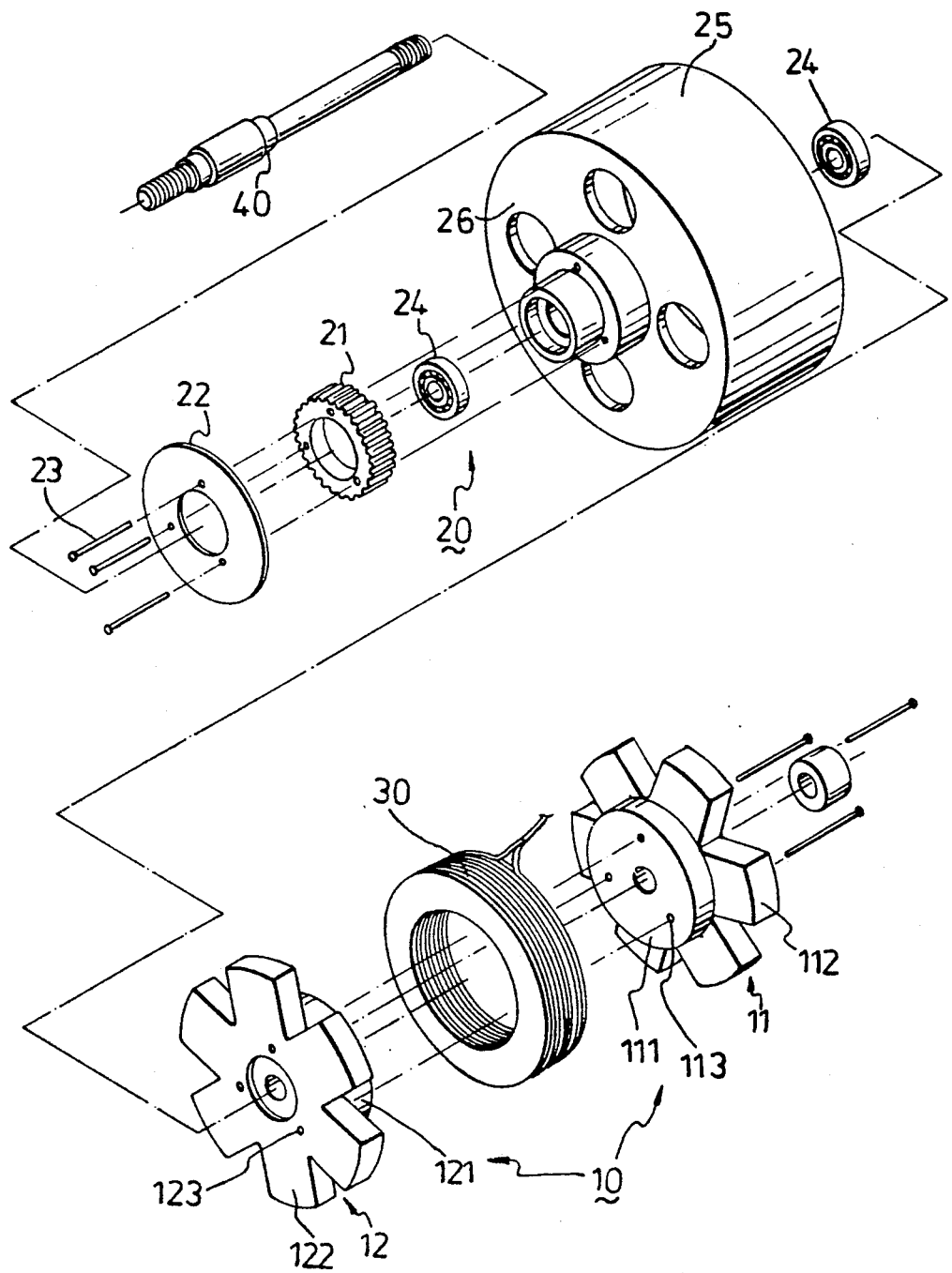
FIG. 1 is a perspective exploded view of a load applying device for an exercise bicycle of this invention.
Figure 2:
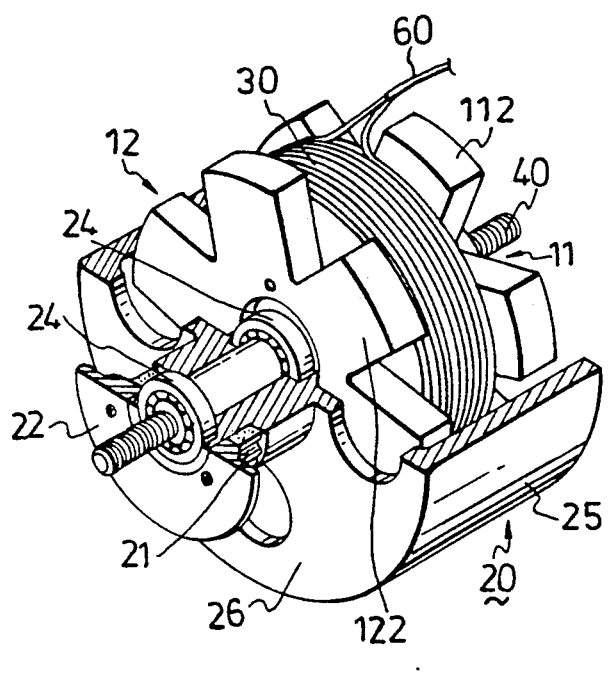
FIG. 2 is a perspective partial view, of the load applying device for an exercise bicycle.

Referring to FIGS. 1, 2, a load applying device for an exercise bicycle of this invention is connected by means of a belt to a transmission gear of the exercise bicycle. The load applying device includes an electromagnet 10, a cup-shaped rotary disk 20, an annular exciting coil 30, and a fixed main shaft 40. The electromagnet 10 and the exciting coil 30 are coaxially fixed to the main shaft 40 while the rotary disk 20 is rotatably mounted to the main shaft 40.

The electromagnet 10 includes a first and a second disk 11, 12 engaged with each other, each of which has a central cylinder 111, 121 respectively protruding therefrom and connected to each other to define a positioning shaft, so that the annular exciting coil 30 can be threaded by said positioning shaft and fixed between said first and second disks 11, 12. Each of the first and second disks 11, 12 has six radially projecting teeth 112, 122 formed on the circumference. The teeth 112 of the first disk 11 are staggered axially with the teeth 122 of the second disk 12, as best illustrated in FIG. 2. The central cylinder 111, 121 of the first and second disks 11, 12 respectively have a set of three threaded holes 113, 123 axially formed therethrough.

The cup-shaped rotary disk 20 is a conductor and a magnetic conductor and is rotatably coupled to the main shaft 40 by two bearings 24. The cup-shaped rotary disk 20 has a circumferential cylindrical wall 25 axially extending from a flat bottom portion 26 thereof. The inner diameter of the cylindrical wall 25 of the rotary disk 20 is slightly larger than the outer diameter of the first and second disks 11, 12 of the electromagnet 10, so that the teeth 111, 121 of the first and second disks 11, 12 are received in said rotary disk 20, but not in contact with the cylindrical wall 25 of said rotary disk 20. A spur gear 22 is coaxially fixed to the bottom portion 26 of the rotary disk 20 by a fixing disk 22 and three screws 23. The screws 23 respectively pass through the threaded holes 123, 113 of the second and the first disks 12, 11, so that the first and the second disks 11, 12 can be engaged with each other in a manner as described hereinbefore. The diameter of the fixing disk 22 is greater than the outer diameter of the spur gear 21. The spur gear 21 is connected to the transmission gear of the exercise bicycle (not shown) by a belt (not shown). Therefore, when the transmission gear is rotated by pedaling the pedal of the exercise bicycle, the spur gear 21 and thereby the rotary disk 20 can be rotated. The ratio of radius or number of teeth between the transmission gear and the spur gear 21 can be properly adjusted according to practical operation conditions. It is noted that only the rotary disk 20 is rotated by the belt while the other components of the load applying device of this invention are not rotated thereby.

Figure 3:
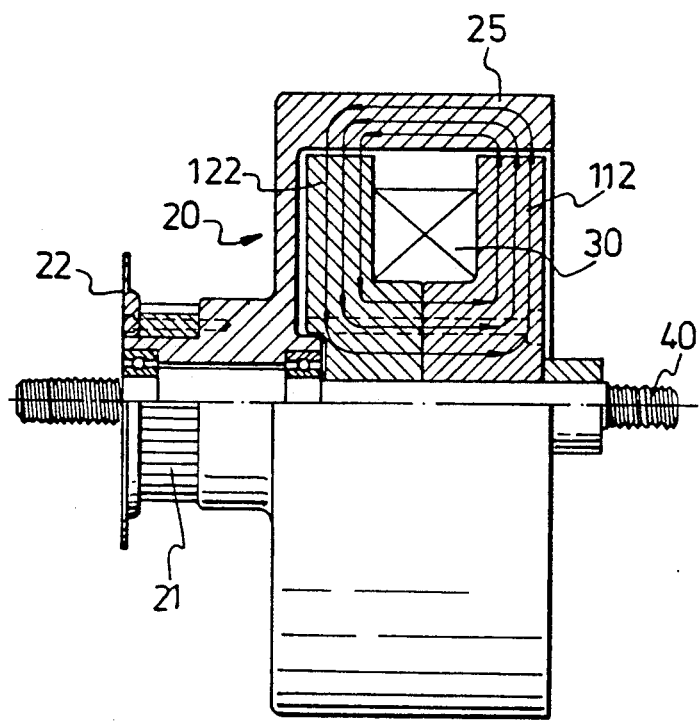
FIG. 3 is a radially sectional schematic view showing the magnetic flux path in the load applying device for an exercise bicycle of this invention.
Figure 4:
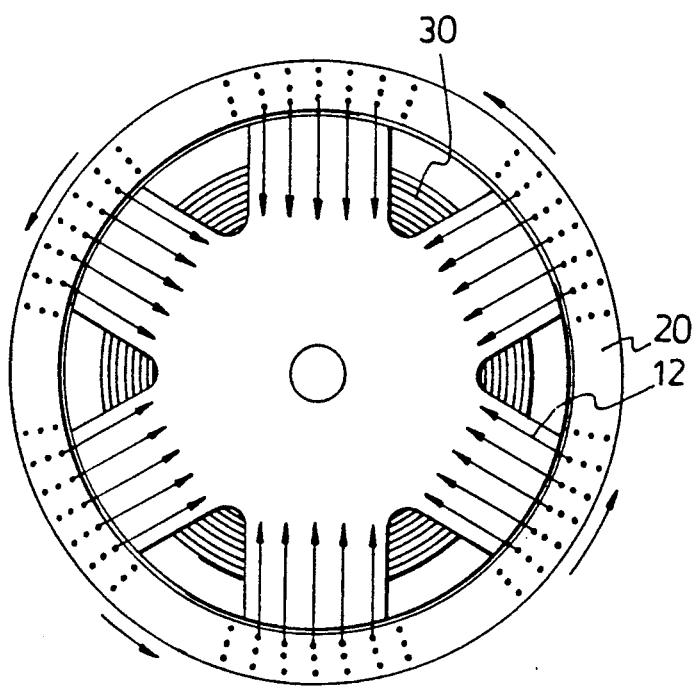
FIG. 4 is an axially sectional schematic view showing the magnetic flux path in the load applying device for an exercise bicycle of this invention.

Referring to FIGS. 3, 4, radially and axially sectional views of the magnetic flux path of the load applying device according to this invention are shown, respectively. When a DC controlling current is applied to the exciting coil 30 by means of a wire 60, a magnetic field is created. The magnetic lines of force of the magnetic field flow from the central portion of the exciting coil 30 and pass through said positioning shaft of the electromagnet 10 to the radially projecting teeth 112 of the first disk 11. The magnetic lines of force flowing to the radially projecting teeth 112 are divided into six beams and then pass through the surface of the cylindrical wall 25 of the rotary disk 20 to the six radially projecting teeth 122 of the disk 12, i.e. the second pole of the electromagnet, thus forming a closed magnetic flux path.

In operation, a user first selects a proper DC controlling current, which serves as a coil current applied to the exciting coil 30, according to his/her physical condition and the exercise required by himself/herself. When the user pedals the exercise bicycle and rotates the transmission gear of the exercise bicycle, the spur gear 21 and thereby the rotary disk 20 are rotated by means of the belt connecting said transmission gear of the exercise bicycle and said spur gear 21 of the rotary disk 20. At the same time, the DC controlling current passes through the exciting coil 30 to create a magnetic field and enable the beam-like magnetic lines of force to pass through the cylindrical wall 25 of the rotary disk 20 in a manner as mentioned above. The magnetic lines of force will be cut by the rotating cylindrical wall 25 of the rotary disk 20, inducing in said cylindrical wall 25 an eddy current which produces a brake effect thereto. In this way, the load applying device can provide a load effect to a rotating shaft in association with the rotary disk 20. It is noted that the magnetic lines of force of the magnetic field pass parallel through the cylindrical wall of the rotor, so that the intersection area between said magnetic lines of force and said rotor according to this invention is larger than that of a conventional load applying device, in which the magnetic lines of force transverse the rotor thereof.

Figure 5:
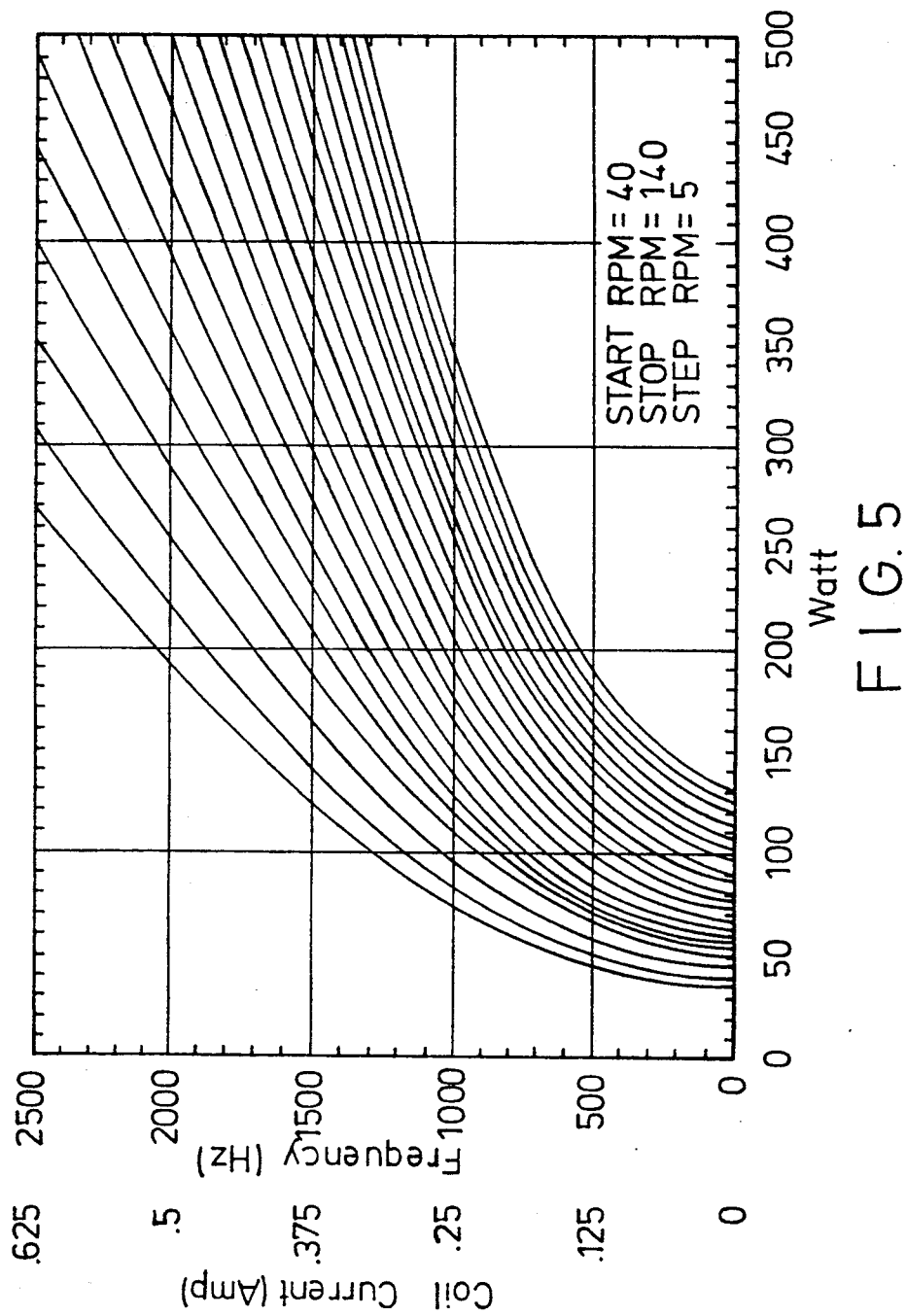
FIG. 5 is a diagram showing the experimental results obtained by utilizing the load applying device for an exercise bicycle according to this invention controlled by a computer.

To prove the superiority of the load applying device of this invention, said load applying device is connected to a servo motor, a torque meter and the crank shaft of the exercise bicycle and tested under the control of a computer. The resulting data are illustrated in FIG. 5, wherein the related parameters are as follows:

| | |
|---|---|
| * turns of the exciting coil: | 650 |
| * gap between the cylindrical wall of the rotary disk and the axial protecting teeth of the electromagnet: | 0.25 mm |
| * inner diameter of the cylindrical wall of the rotary disk: | 140 mm |
| * outer diameter of the cylindrical wall of the rotary disk: | 166 mm |
| * ratio of the rotating speed of the transmission gear to the spur gear: | 25:54 |

In accordance with the present invention, because the load applied to a user riding on the exercise bicycle is adjusted by means of selecting a DC controlling current to control Watts, the curvatures in the graph of coil current versus Watts is used for curvature analysis. Further, the relationship between the frequency of the power supply and the controlling current, i.e., the coil current, and Watts is shown in the following formula, which is obtained by numerical analysis method:

$$Hz = a1*(Load - c1) + b1 * \log e1$$

Hz: the frequency of the power supply.
The relation between Hz and the Ampere is: 4kHz=1 Amp
Load: detected Watts
a1, b1, c1, e1: coefficients obtained by numerical analysis which are varied with the rotating speed of the pedals of the exercise bicycle (RPM1).
The relationship of abovementioned coefficients and RPM1 is as follows:

$$a1 = 0.77037 + 13.81774 * \exp((-1)*0.02995*RPM1)$$

$$b1 = 250.96092 + 0.62827*RPM1$$

$$c1 = (-1)*4.5611 + 0.92825*RPM1$$

$$d1 = 0.01899 + 1.47316*\exp((-1)*0.03022*RPM1)$$

$$e1 = (Load - c1)*d1 + 1$$

It can be seen from the curvatures in FIGS. 5(A), 5(B) that the load applying device of this invention is helpful for permitting an exercise bicycle to be controlled by a computer and planning the load to be applied to the user, based on the following reasons:
 (1) The slope of each of the curvatures is more close to a constant value, that is, more linear.
 (2) When the rotating speed (RPM) is varied, the variation of the curvature is more regular. Therefore, these curvatures can be more easily expressed or simulated with a simple formula by numerical analysis. In addition, in practical operation, the variation of the load (Watts) is more regular when the rotating speed (RPM) is varied and the coil current remains constant.

With this invention thus explained, it is apparent that numerous modifications and variations can be made without departing from the scope and spirit of this invention. It is therefore intended that this invention be limited only as indicated in the appended claims.

I claim:
1. A load applying device for applying a load to an exercise bicycle, said exercise bicycle having a rotating means operated by a user riding on said exercise bicycle, said load applying device comprising:
 a fixed main shaft;
 an annular exciting coil which creates a magnetic field when a DC current is applied thereto by means of a wire connected thereto;
 an electromagnet fixed to said main shaft having a first and a second disk coaxially fixed to said main shaft, serving as a first and a second pole in said magnetic field, each of said first and said second disk having a central projection axially formed thereon which faces toward and engages with the other said central projection to define a positioning shaft, so that said annular exciting coil can be threaded by said positioning shaft and fixed between said first and said second disks;

a rotor rotatably mounted to said main shaft and adapted to be rotated by said rotating means of said exercise bicycle, said rotor being a cup-shaped disk having a flat bottom portion and a circumferential cylindrical wall axially extending from said bottom portion and sleeved around said first pole and said second pole of said electromagnet but not in contact therewith so that said magnetic field is cut parallelly by said cylindrical wall of said rotor when said rotor is rotated by said rotating means of said exercise bicycle, creating an eddy current in said rotor for braking said rotor.

2. A load applying device as claimed in claim 1, wherein each of said first and said second disks has a plurality of radially projecting teeth formed at a periphery thereof, said radially projecting teeth of said first disk being staggered axially with said radially projecting teeth of said second disk.

3. A load applying device as claimed in claim 1, wherein said central portions of said first and second disks of said electromagnet are cylinders with same diameters.

4. A load applying device as claimed in claim 1, wherein said rotor has a spur gear fixed to said bottom portion, which is connected to said rotating means of said exercise bicycle so that said rotor can be rotated by said rotating means of said exercise bicycle when said rotating means is rotated by said user.

* * * * *